Sept. 8, 1953  M. DUCLOS  2,651,112
GAUGE
Filed June 9, 1951

INVENTOR.
MARC DUCLOS
BY Leon M. Straus
AGT.

Patented Sept. 8, 1953

2,651,112

UNITED STATES PATENT OFFICE 2,651,112

GAUGE

Marc Duclos, Rolle, Switzerland

Application June 9, 1951, Serial No. 230,757
In Switzerland September 23, 1949

9 Claims. (Cl. 33—148)

This invention relates to a caliper or gauge. The present invention is characterised by the fact that the gauge comprises a pin longitudinally movable on a support or in a casing against the action of at least one return spring, this pin carrying at least one worm in mesh with two toothed sectors provided on two feeler fingers rotatably mounted in the casing, this pin moreover being provided with a shoulder-providing element which is adapted to displace an abutment carried by a lever capable of oscillation so as to shift a movable needle relatively to a scale, means being provided for regulating the maximum and minimum spacing apart of the feeler fingers. This whole assembly is arranged in such a way that when the feeler fingers are rotated, they actuate the movable pin and, through the latter, the above mentioned needle.

The annexed drawing shows, by way of example, an embodiment of the gauge which forms the subject of the invention.

Figure 3:
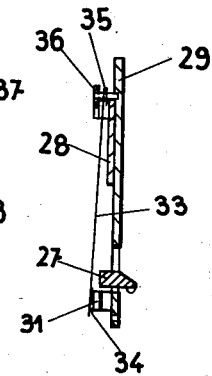
Figure 3 is a plan view of a platform provided in the gauge for mounting the indicator parts.
Figures 4, 5:
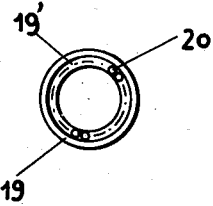
Figure 4 is a section on line II—II of Fig. 3.
Figure 5 is a view of a constructional detail.
Figure 1:
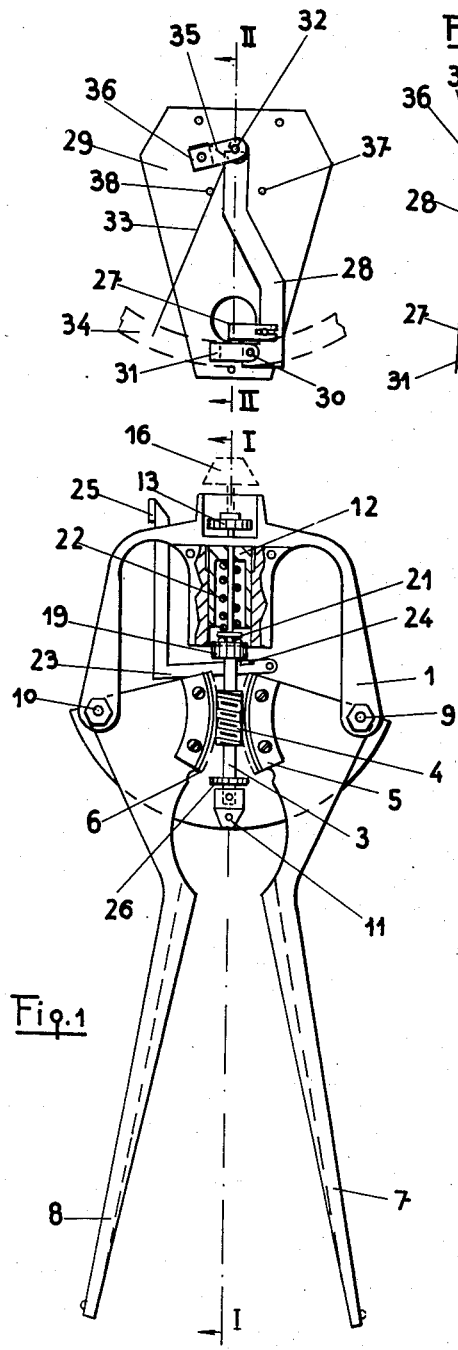
Figure 1 is a plan view.
Figure 2:
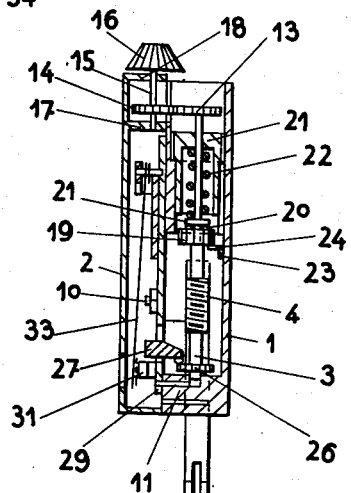
Figure 2 is a sectional view along I—I of Fig. 1.

The gauge illustrated comprises a casing 1 furnished with a cover 2.

Mounted on the casing 1 is a pin 3 which is longitudinally movable and carries a worm 4 in mesh with two toothed sectors 5 and 6 provided at the rear ends of two feeler fingers 7 and 8. These latter are located on either side of the pin 3 and are rotatably mounted on two pins 9 and 10 carried by the casing 1.

The pin 3 is mounted, on the one hand, on a support 11 which acts as a stop limiting its displacement in one longitudinal direction and, on the other hand, in a sleeve 12 screwed into the casing 1. This pin 3 carries a toothed wheel 13 adapted for rotation to move the toothed sectors 5 and 6 for the purpose of regulating the maximum and minimum spacing between the feeler fingers 7 and 8 in accordance with the bore diameter to be measured. To effect such movement the toothed wheel 13 meshes with a pinion 14 on a spindle 15 which is rotatable by means of a knurled knob 16, this spindle 15 being mounted on two cheeks 17 and 18 of the cover 2.

The movable pin 3 is moreover provided with a disc 19 which is loaded, through the intermediary of ball bearings 20 and a ring 21, by means of a return spring 22 housed in the sleeve 12. The ball bearings are arranged in a raceway formed by a circular groove 19' in the face of disc 19 opposite the ring 21. The sleeve 12 serves through intermediary of spring 22 and of the ring 21 to limit the longitudinal displacement of pin 3 in the direction opposite to that previously mentioned.

Pivoted in casing 1 is a bellcrank lever 23 having a lug 24 adapted to displace the disc 19, and consequently pin 3, against the action of return spring 22, and on the other hand carrying, externally of the casing 1, a push button 25 which is capable of being manually actuated with the above-mentioned aim.

In addition, the movable pin 3 is furnished with a circular, shoulder-providing element 26 which is adapted to displace an abutment 27 secured on a lever 28 carried by a platform 29 fixed within the casing 1. One end of lever 28 is pivoted to a pin 30, mounted on platform 29 and on a support 31 provided on the latter, and its other end is arranged to rotate, by means of a set of teeth, a pivotable pinion 32.

The latter is furnished with a needle 33 movable over a dial portion 34 provided with a scale. This needle is urged by a spiral spring 35 which returns it to its starting position when it has been moved. One end of this spring 35 is fixed to a support 36 co-operating with the platform 29 to retain the pinion 32.

Two eccentrically-headed screws 37 and 38, fixed on the platform 29, limit the angular displacement of the lever 28.

The gauge illustrated is used as follows:

The maximum and minimum spacing which can be assumed by the feeler fingers 7 and 8 is regulated by means of the knurled knob 16, wheel 13, pin 3, worm 4, and toothed sectors 5 and 6 in relation to the diameter of the bore to be measured. The said fingers are then moved along the bore in question, and the variations in the spacing between them thereby produced causes them to rotate about their axes 9 and 10 so effecting the rotary movement of toothed sectors 5 and 6, which shifts the pin 3 longitudinally. The movements of this latter are transmitted by the abutment 27, lever 28, and pinion 32 to the needle 33, which thereby indicates on the scale 34 the variations in spacing of the fingers 7 and 8.

The lever 23, acting on toothed sectors 5 and 6 through the agency of lug 24, disc 19, and pin 3, enables the feeler fingers 7 and 8 to be closed towards one another to facilitate their introduction into the bore to be measured.

The gauge illustrated enables different bore diameters to be measured. In a modified embodiment of the invention, not illustrated, there is provided a gauge in which the pin is longitudinally movable and is provided with two worms in mesh with two toothed sectors which have two feeler fingers mounted to pivot in a casing, these toothed sectors and fingers being located on one side only of the movable pin. One of the worms is rigid with the movable pin and the other is keyed to the latter but is movable longitudinally.

Having thus described the invention, what is claimed as new and desired to be secured by Letters Patent is:

1. A gauge for indicating variations in diameters of bores comprising a support, a spring-urged pin mounted for rotation and longitudinal motion on said support, a worm gear mounted for rotation together with said pin, a pair of spaced feeler fingers mounted on said support for pivotal displacement to each other and including toothed sectors engaging said worm gear, an element on said pin, a first lever mounted for oscillation on said support and including abutment means, said element engaging said abutment means so as to oscillate said lever, indicator means connected to said lever for marking pivotal displacement of said feeler fingers, and means mounted on said support for limiting the maximum and minimum pivotal displacement of said feeler fingers, whereby upon rotation of said pin spacing of said feeler fingers is caused and variations in said pivotal displacement of said feeler fingers due to variation in diameters of bores are marked by said indicator means.

2. A gauge for indicating variations in diameters of bores comprising a casing, a spring urged pin mounted for rotation and longitudinal motion on said casing, a worm gear mounted for rotation together with said pin, a pair of spaced feeler fingers mounted on said casing for pivotal movement with respect to each other and including toothed sectors engaging said worm gear, an element on said pin, a first lever mounted for oscillation on said casing and including abutment means and a toothed extremity, said element engaging said abutment means so as to oscillate said lever, a pinion on said casing for engagement with said toothed extremity of said lever, indicator means connected to said pinion for marking pivotal displacement of said feeler fingers, and means mounted on said casing for limiting the longitudinal motion of said pin and the maximum and minimum pivotal displacement of said feeler fingers, whereby upon rotation of said pin spacing of said feeler fingers is caused and variations in said pivotal displacement of said feeler fingers due to variations in diameters of bores are marked by said indicator means.

3. A gauge as set forth in claim 2, comprising a toothed wheel attached to said pin, and gear means engaging said toothed wheel and adapted to be manually actuated in order to cause spacing of said feeler fingers.

4. A gauge as set forth in claim 2, including platform means mounted in said casing for supporting on said casing said first lever, said pinion, and said indicator means.

5. A gauge as set forth in claim 2, including spring means urging said indicator means to an inoperative position and urging said abutment means on said first lever into engagement with said element on said pin.

6. A gauge as set forth in claim 2, including a disc mounted on said pin and including a shoulder, a second lever being adapted to engage said disc and enabling the pivotal displacement of said feeler members and facilitate their introduction into the diameters of the bores.

7. A gauge as set forth in claim 6, wherein said disc includes a circular groove, ball bearings mounted in said groove and urged against the inner wall thereof by engagement therewith of one end of said spring on said spring urged pin.

8. A gauge as set forth in claim 6, wherein said means for limiting displacement of said feeler fingers includes a sleeve mounted on said casing and receiving one end of said spring urged pin, one extremity of said sleeve being adapted to be engaged by said disc in order to limit the longitudinal motion of said pin and the minimum pivotal displacement of said feeler fingers.

9. A gauge as set forth in claim 6, wherein said means for limiting displacement of said feeler fingers includes support means mounted at one end of said casing and receiving one end of said spring urged pin, whereby longitudinal motion of said pin and the maximum pivotal displacement of said feeler fingers are predetermined.

MARC DUCLOS.

References Cited in the file of this patent

UNITED STATES PATENTS

| Number | Name | Date |
| --- | --- | --- |
| 1,334,955 | Johansson | Mar. 30, 1920 |
| 1,428,422 | Dudukiam | Sept. 5, 1922 |
| 2,032,584 | Lengel | Mar. 3, 1936 |
| 2,332,010 | Pike | Oct. 19, 1943 |